Oct. 5, 1965   N. HAGEN   3,209,404
EXTRUDER
Filed July 5, 1962   2 Sheets-Sheet 1
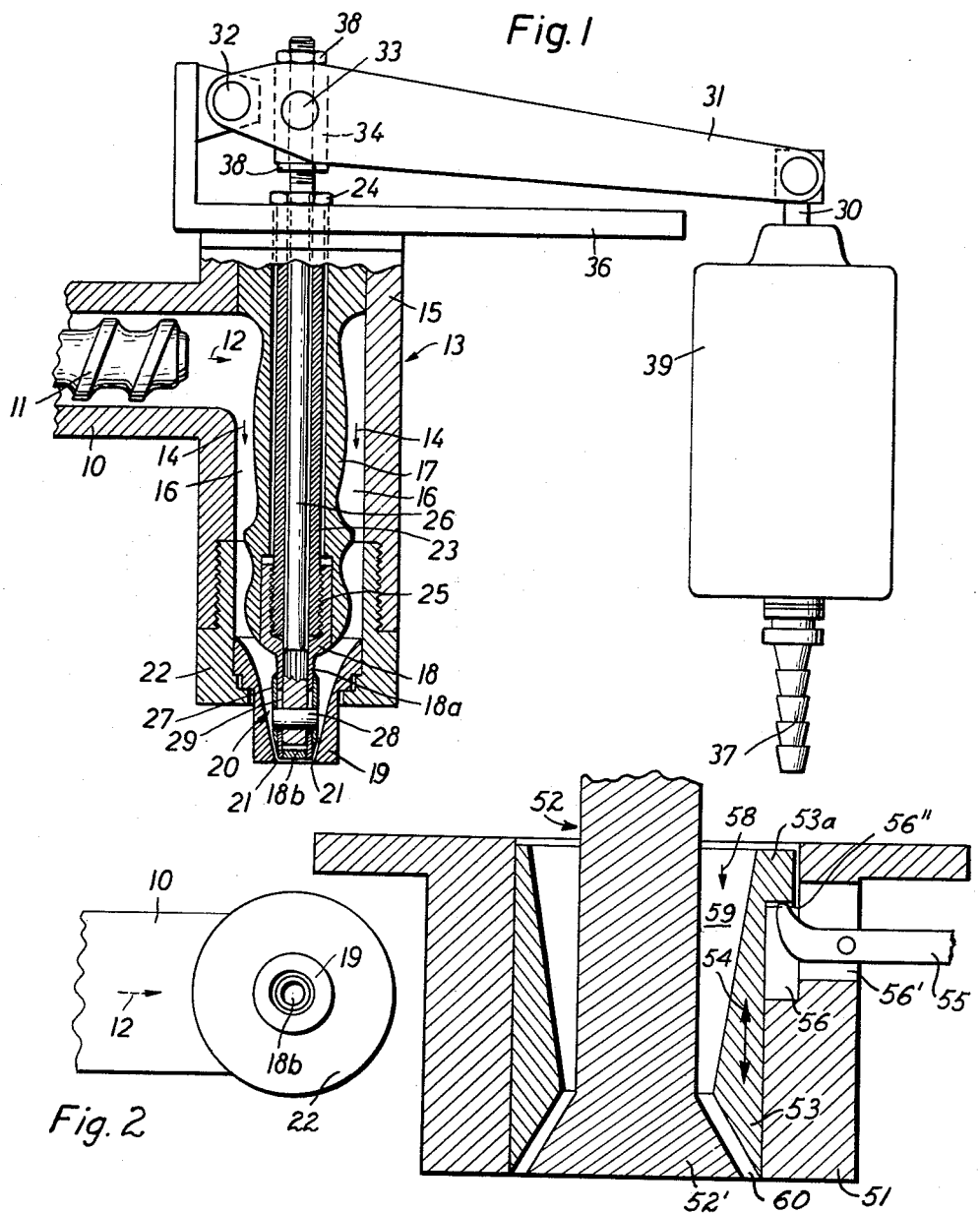
INVENTOR
Norbert Hagen
BY Richard Low
Agt Oct. 5, 1965   N. HAGEN   3,209,404
EXTRUDER
Filed July 5, 1962   2 Sheets-Sheet 2
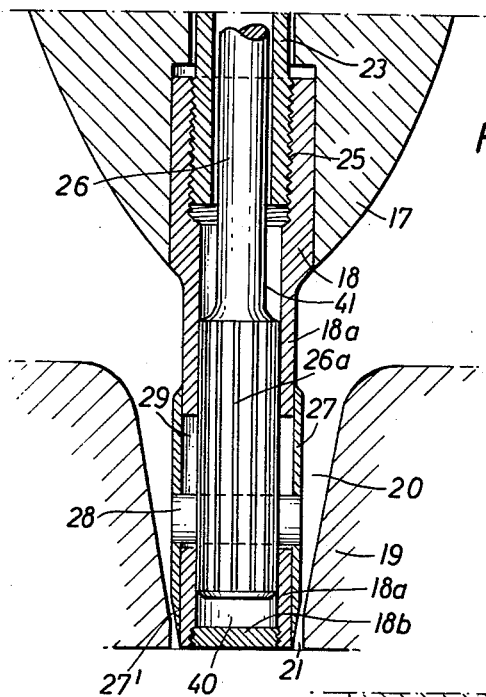
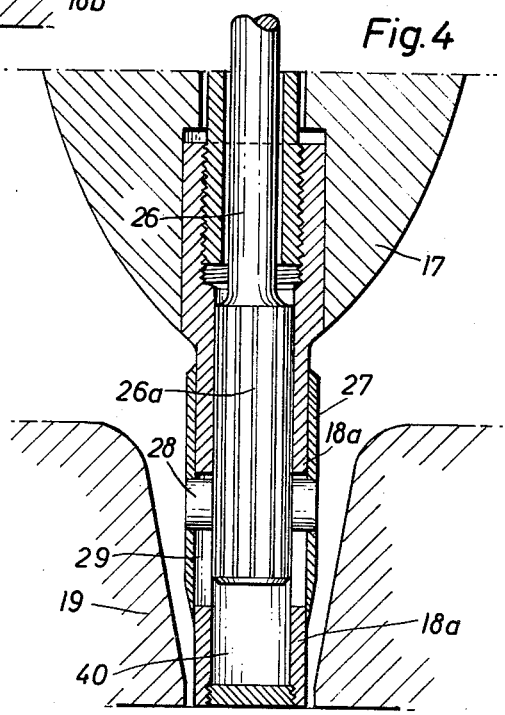
INVENTOR
Norbert Hagen
BY United States Patent Office 3,209,404
Patented Oct. 5, 1965

3,209,404
EXTRUDER
Norbert Hagen, Stadtwaldstrasse, Kuppenheim,
Murgtal, Germany
Filed July 5, 1962, Ser. No. 207,564
Claims priority, application Germany, Aug. 3, 1961,
R 30,869
2 Claims. (Cl. 18—14)

This invention relates to extrusion apparatus such as screw extruders for thermoplastic synthetic material, and more particularly to an apparatus for extruding tubular bodies of thermoplastics and the like.

In its more specific aspects, this invention is concerned with the problems arising in the manufacture of plastic objects from relatively short lengths or blanks of tubular material which are severed from the continuous stream of material as it leaves the extruder nozzle. The problems are relevant to the blow molding of bottles and the like from freshly extruded lengths of tubular plastic material. In the blow molding of bottles the cross section of which varies in the direction of extrusion of the original tube, as in conical bottles, the wall thickness near the apex of the conical shape is normally greater than near the base if the original tubular blank had a uniform wall thickness. It is frequently desirable that the wall thickness of the bottle be uniform over the height thereof.

Another problem with the solution of which this invention is concerned arises in the extrusion of tubular plastic material from vertically downward facing annular nozzles. Because of the fluidity of the extruded material, the last extruded portion of each extruded blank tends to stretch, and to be thinned out by the weight of the first extruded portion. A cylindrical bottle of uniform wall thickness is not readily blow molded from such a non-uniform blank.

In order to control short term variations in wall thickness of extruded tubular blanks, it has previously been proposed to reciprocate the mandrel of the extruder die in the direction of material extrusion during extrusion of each blank. The nozzle which is defined between the die and the mandrel tapers towards its annular orifice. Withdrawal of the mandrel from the orifice increases the size of the orifice, and vice versa. The blank may thereby be made to vary in thickness over its length, or undesirable thickness variations may be compensated for and eliminated.

Because of the high working pressure at the extruder orifice, it is difficult to make the extruder mandrel axially movable without impairing the stability of the nozzle structure in a direction transverse of the axial mandrel movement. If the precisely centered position of the mandrel cannot be retained during the axial movement, and it is quite difficult to guide the mandrel axially without some play in a transverse direction, the resulting uneven thickness distribution along the circumference of the extruded tube may raise difficulties more serious than those which the axial mandrel movement is capable of solving.

It is another inherent disadvantage of an axially movable mandrel that the end faces of the mandrel and of the die adjacent the nozzle orifice are not always in a common radial plane. When the mandrel is retracted inward of the die end face, the extruded tube tends to roll up in an outward direction as it leaves the die orifice. This can be prevented by suitable auxiliary devices, but is at least inconvenient. When the mandrel projects outward beyond the die, the tube rolls up inwardly, and a useful product cannot be obtained under such circumstances.

The non-uniform stress distribution which results from axially offset end faces of the mandrel and the die, and which produces inward or outward rolling of the extruded tube is particularly harmful when extruded blanks are cut from the continuously extruded tubular material by a cutting blade adjacent the nozzle orifice. When the mandrel is retracted inward of the nozzle, the leading end portion of the blank is sealed by the cutting blade. When the mandrel projects outward beyond the end face of the die, transverse cutting of the tubular extrudate adjacent the nozzle orifice is impossible.

The object of the invention is the provision of control means for an extruder which permit the wall thickness of the extrudate to be varied in the direction of extrusion without any danger of unfavorably affecting the uniformity of wall thickness along the circumference.

Another object is the provision of such control means which do not involve relative movement of the mandrel and die.

More specifically, the invention aims at an extruder permitting controlled variations in wall thickness without setting up stresses which would cause the extruded blanks to roll up.

With these and other objects in view, the invention in one of its aspects provides a tubular member which is mounted either on the die or on the mandrel, the mandrel jointly with the die defining an annular extrusion nozzle, and means for moving the tubular member in the direction of the nozzle axis toward and away from a position in which the tubular member obstructs a portion of the nozzle orifice.

Other features and many of the attendant advantages of this invention will be readily appreciated as the same becomes better understood by reference to the following detailed description of preferred embodiments when considered in connection with the accompanying drawings wherein:

FIG. 1 shows an extruder head of the invention in elevational section on its axis;

FIG. 2 is a bottom view of the extruder head of FIG. 1;

FIG. 3 shows a detail of the apparatus of FIG. 1 on a larger scale in a first operating position;

FIG. 4 shows the device of FIG. 3 in a second operating position; and

FIG. 5 shows another extruder head of the invention in a view corresponding to that of FIG. 1.

Referring now to the drawing in detail, and initially to FIGS. 1 to 4, there is seen the head end of a screw extruder including a barrel 10 and a screw 11 rotatable in the barrel 10 in the usual manner to discharge thermoplastic material in the direction of the arrow 12 into a T-head or diehead 13. The T-head has a cylindrical tubular shell 15 having a vertical axis. A spreader 17 sealingly closes the upper axial end of the shell 15 and is radially spaced from the remaining inner wall of the shell 15 to define therewith an annular passage 16 for flow of plastic material in the direction of the arrow 14 toward the lower axial end of the shell 15.

An annular die holder 22 is threadedly attached to the lower end of the shell, and retains a die insert 19 against the outward pressure of the plastic material. A tubular mandrel 18 is axially movable, but secured against rotation in an axially elongated cavity of the spreader 17. A cylindrical portion 18a of the mandrel projects coaxially outward of the spreader. Its free end is closed by an end plate 18b. An inner approximately conical face of the die insert 19 and the cylindrical outer face of the mandrel portion 18a jointly define an extrusion nozzle 20 which terminates in an annular orifice 21. The die insert 19 has a radial end face in a common plane with the free outer surfaces of the end portion 18a and the end plate 18b.

A coaxial hollow threaded pin 23 loosely passes through the axially elongated cavity of the spreader 17. Engaging threads 25 on the mandrel 18 and on the lower terminal portion of the pin 23 connect the mandrel and pin so that the mandrel 18 may be shifted axially for proper alignment with the die insert 19 by rotating the pin 23. For this purpose, the other terminal portion of the pin 23 has a hexagonal collar 24 fixedly fastened thereto. The collar 24 abuts against the T-head 13 and prevents movement of the mandrel outward of the orifice 21 under the frictional forces exerted by the extruded material.

A rod 26 is axially movable within the hollow pin 23. As clearly seen from FIGS. 3 and 4, the axial end portion of the rod 26 near the nozzle 20 is radially enlarged for a close movable fit in the axial passage of the mandrel 18 and the mandrel end portion 18a. The enlarged end portion of the rod 26 defines together with the end plate 18b and the end portion 18a of mandrel 18 a space 40, and together with the mandrel 18 a space 41. The spaces 40, 41 communicate through axial grooves 26a in the cylindrical surface of the enlarged end portion of the rod 26.

Two axially elongated radially extending slots 29 in the mandrel portion 18a are diametrically opposite each other and accommodate a wedge shaped connecting pin 28 which is inserted in the rod 26. The free ends of the pin 28 outside the mandrel portion 18a are secured to a tubular sleeve 27 which is axially slidable on the mandrel portion 18a in closely conforming contact with the cylindrical face of this mandrel portion.

Axial movement of the rod 26 is transmitted to the sleeve 27 by the pin 28, and is limited by abutment of the pin 28 against the mandrel portion 18a in the slots 29. FIGS. 3 and 4 respectively illustrate the two extreme axial positions of the sleeve 27 and of the attached pin 28 and rod 26. The two axial end portions 27' of the sleeve 27 are conically tapered so as to offer as little resistance to the flow of plastic through the nozzle 20 as possible. In the position shown in FIG. 3, the sleeve 27 is positioned so that its lower axial end portion 27' is flush with the common plane of the outer surface of the end plate 18b and with the radial end face of the die insert 19. In this position, the sleeve 27 obstructs a major portion of the orifice 21.

In the other extreme axial position shown in FIG. 4, the sleeve 27 is spaced from the aforementioned common plane inward of the nozzle 20 and does not offer significant resistance to the flow of plastic through the nozzle 20 and out of the orifice 21.

Reverting now to FIG. 1, it is seen that an end portion of the rod 26 remote from the nozzle 20 projects out of the hollow pin 23 and carries a cross head 34. A bracket 36 fixedly attached to the T-head 13 is connected to one end of a one-armed lever 31 by means of a pivot pin 32. The other end of the lever 31 is hinged to a piston rod 30 of a non-illustrated piston axially slidable in a cylinder 39. A portion of the lever 31 intermediate the ends and adjacent the pivot pin 32 is fastened to the cross head 34 by a rod 33. The relative axial position of the pin 26 and of the cross head 34 is adjustably fixed by two nuts 38 threadedly engaging the pin 26 on opposite sides of the cross head.

A hose nipple 37 on the cylinder 39 is normally connected to a source of pressure fluid (not shown) by a flexible pressure hose in the usual manner. While the pressure fluid system intended for use with the extruder has not been shown, it will be understood to include a control valve actuated by a cam for admitting and releasing fluid to and from the cylinder 39 in timed sequence with the rotation of the extruder screw 11 in a manner well known in itself.

The apparatus illustrated in FIGS. 1 to 4 operates as follows:

In the position of FIG. 4 a relatively large amount of plastic is extruded from the partly obstructed orifice 21, and the tube extruded is thick-walled.

When pressure fluid is admitted to the cylinder 39 through the hose nipple 37, the non-illustrated piston drives the piston rod 30 outward of the cylinder and lowers the sleeve 27 toward the position illustrated in FIG. 3 in which the orifice 21 is narrowed. A relatively thin-walled tube is extruded. Obviously, any intermediate position of the sleeve 27 may be set by controlling the pressure or the volume of the fluid admitted to the cylinder 39. Depending on specific operating conditions, the fluid may be either compressed air or hydraulic fluid, as is well known.

The aforementioned valve actuating cam moving in synchronization with the extruder screw 11 may be shaped to provide any desired cycle of fluid flow to the cylinder 39, and thereby any desired cyclic variation of the wall thickness of the tubular blank extruded from the orifice 21. The specific shape of the cam will be readily deduced from the shape of a blow molded article to be produced from the extruded tubular blank, and the characteristics of the extruder, and of the extruded material.

If it is merely intended to produce blanks of uniform wall thickness, the sleeve 27 is moved slowly during extrusion of each blank in a direction from the position of FIG. 3 toward that of FIG. 4 in order to increase the wall thickness for the trailing end portion of the blank in such a manner as to balance the thinning out caused by the weight of the leading portion. The return stroke of the sleeve 27 preferably takes place while a terminal portion of the blank is being extruded. This terminal portion is severed from the leading terminal portion of the subsequent blank before it can be extended and thinned by the weight of the first extruded blank portion. Those skilled in the art will readily determine the details of operating procedure in accordance with common practice.

The sleeve 27 normally prevents seepage of fluid plastic material into the slots 29. If any plastic material should find its way past the sleeve 27 into the hollow interior of the mandrel 18, it collects in the spaces 40 and 41, and can move back and forth between these spaces through the grooves 26a without significantly impeding axial movement of the rod 26.

Another embodiment of the invention is illustrated in FIG. 5 in a fragmentary axially sectional view. The extruder barrel and screw are not shown in FIG. 5, and may be of any conventional type such as that shown in FIG. 1. The die 51 and mandrel 52 which jointly define an annular nozzle 59 therebetween are each of unitary structure, but they may each be assembled from a plurality of elements in the manner illustrated in FIGS. 1 to 4. The mandrel 52 has a portion 52' which flares conically toward the annular orifice 60 of the nozzle 59. The inner wall of the die 51 opposite the mandrel 52 is cylindrical.

A tubular sleeve 53 has an outer cylindrical face in sliding contact with the die 51, and has the internal shape of a Venturi tube. The internal wall of the sleeve 53 has two frusto-conical portions joined at their common smaller base, and flaring outward from that base in opposite axial directions. A radial projection 53a on the sleeve 53 extends into an axially elongated slot 56 in the cylindrical wall of the die 51. Axial movement of the sleeve 53 toward the orifice 60 is limited to the position shown in FIG. 5 by abutment of the projection 53a against a shoulder 56" of the die 51 in the slot 56.

Movement of the sleeve 53 in a direction away from the orifice 60 is actuated by a lever 55 pivoted on a pin 57 in a radial aperture 56' in the die 51. The aperture 56' communicates with the slot 56, and both are sealed from the nozzle 59 by the sleeve 53.

One arm of the lever 55 abuts against a radial face of the projection 53a. The other arm is connected to a pressure fluid operated motor similar to or identical with the cylinder 39 in a self-evident manner for moving the sleeve 53 away from the orifice 60 under the pressure of the fluid.

During extrusion of tubular blanks of relatively short axial length, the sleeve 53 is acted upon by the pressure of the extruded plastic in the direction of the arrow 58, and by the pressure of the fluid transmitted by the lever 55 to reciprocate as indicated by the double arrow 54. The lower conically tapering end portion of the sleeve 53 thereby moves toward and away from the position illustrated in FIG. 5 in which the sleeve partially obstructs the orifice 60 to produce a relatively thin-walled extruded tube. Withdrawal of the sleeve 53 inward of the nozzle 59 reduces the flow resistance through the orifice 60 without changing the radial alignment of the end faces of the die 51 and of the mandrel 52.

It should be understood, of course, that the foregoing disclosure relates to only preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. In an extruder a diehead, said diehead including
   (a) two elongated concentrically arranged parts of annular cross-section, said concentric parts being stationary, having an axis, and defining therebetween an axially extending annular passage for the flow of extruded plastics,
   (b) a die member supported by one of said parts, having a radially extending end face, and an opening in said end face,
   (c) a mandrel member extending into said opening and having a radially extending end face, both of said end faces lying in a radially extending common plane, said die member and said mandrel member forming an extrusion nozzle and defining an annular extrusion orifice opening in said common plane, said passage terminating in said extrusion orifice,
   (d) a tubular member having an edge, said tubular member being mounted on one of said die and mandrel members for axial movements relative to said die and mandrel members to vary the size of said extrusion orifice, and extending over a fraction of the elongation of said concentric parts, and
   (e) actuating means for axially moving said tubular member from a position in which said edge is substantially flush with said common plane to a retracted position, and vice versa, said actuating means including a slidably mounted rod member and a connecting member, said rod member being provided with a radially extending aperture, said mandrel member being provided with opposite longitudinally extending slots, said connecting member passing through said aperture and said slots and having end portions thereof fastened to said tubular member, abutment means limiting the sliding movement of said rod member and said connection member, said abutment means being constituted by end walls defining said slots.

2. In an extruder as set forth in claim 1, a portion of said rod member adjacent said aperture being formed with axially extending grooves.

References Cited by the Examiner
UNITED STATES PATENTS

| | | | |
|---|---|---|---|
| 2,044,961 | 6/36 | Waxer | 18—14 |
| 2,632,202 | 3/53 | Haines | 18—14 X |
| 2,750,625 | 6/56 | Colombo | 18—5 |
| 2,780,835 | 2/57 | Sherman | 18—14 |
| 3,019,481 | 2/62 | Negoro | 18—14 X |
| 3,023,461 | 3/62 | Sherman | 18—14 X |
| 3,078,507 | 2/63 | Park | 18—5 X |
| 3,114,932 | 12/63 | Donnelly | 18—5 X |
| 3,147,515 | 9/64 | Amsden | 18—5 X |

J. SPENCER OVERHOLSER, *Primary Examiner.*

MICHAEL V. BRINDISI, WILLIAM J. STEPHENSON,
*Examiners.*